Dec. 3, 1968  J. KEYLWERT  3,413,961
ROTARY PISTON ENGINE, ESPECIALLY CIRCULAR PISTON
INTERNAL COMBUSTION ENGINE
Filed Sept. 22, 1966  3 Sheets-Sheet 1
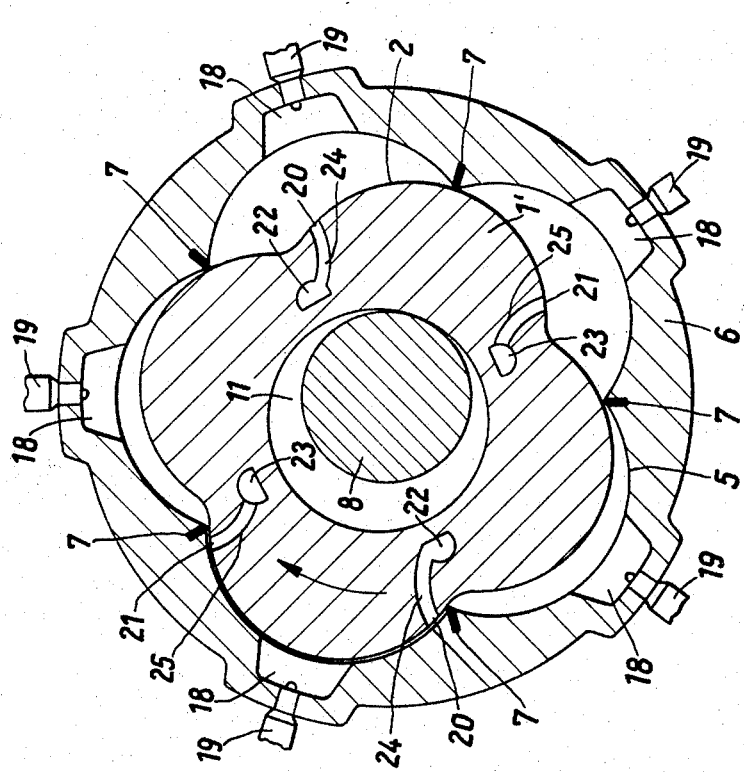
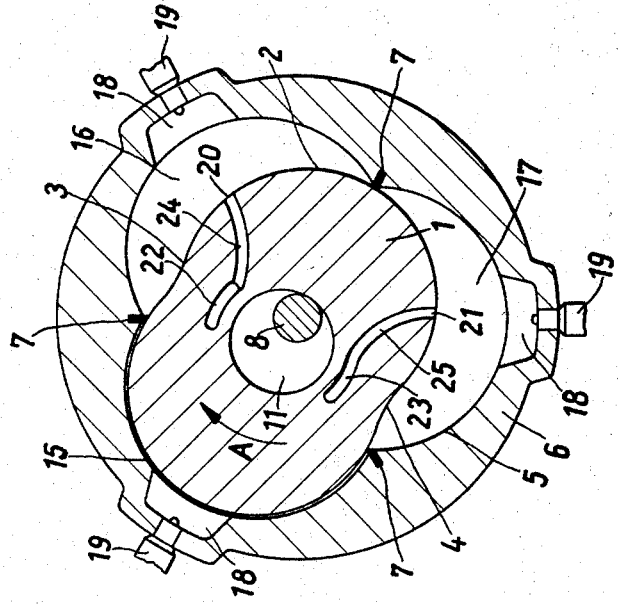
Inventor:
Johann Keylwert
By

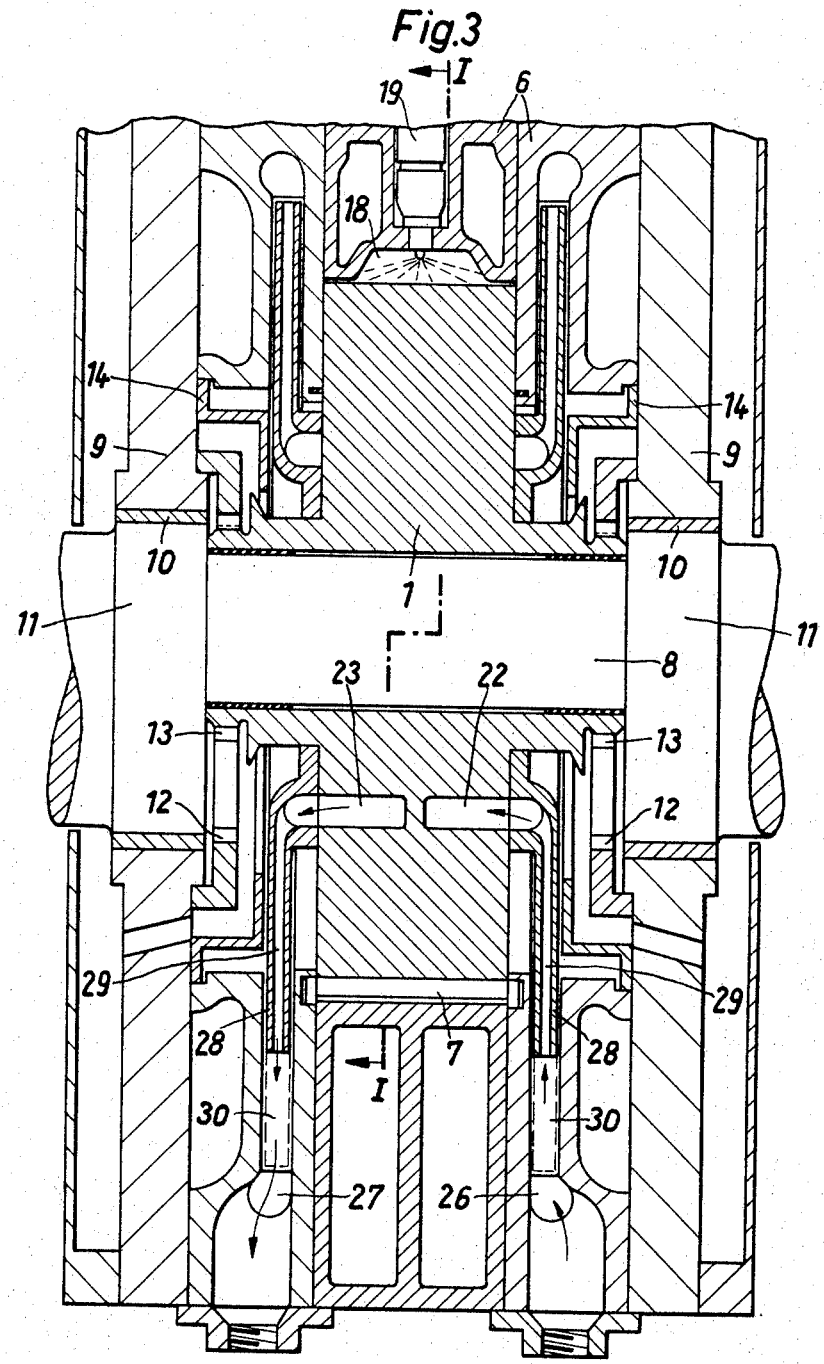

Dec. 3, 1968 J. KEYLWERT 3,413,961
ROTARY PISTON ENGINE, ESPECIALLY CIRCULAR PISTON
INTERNAL COMBUSTION ENGINE
Filed Sept. 22, 1966 3 Sheets-Sheet 3

Inventor:
Johann Keylwert
By
Walter Becker

United States Patent Office 3,413,961
Patented Dec. 3, 1968

3,413,961
ROTARY PISTON ENGINE, ESPECIALLY CIRCULAR PISTON INTERNAL COMBUSTION ENGINE
Johann Keylwert, Cologne-Kalk, Germany, assignor to Klockner-Humboldt-Deutz Aktiengesellschaft, Cologne-Deutz, Germany
Filed Sept. 22, 1966, Ser. No. 581,382
Claims priority, application Germany, Sept. 24, 1965, K 57,216
5 Claims. (Cl. 123—8)

ABSTRACT OF THE DISCLOSURE

Rotary piston internal combustion engine having a trochoidal piston with an even number of lobes and a housing with a trochoidal cavity with one more lobe than said piston. The piston has inlet and outlet passages leading to opposite sides of alternate ones of the lobes thereof and annular channels in the housing communicate with said passages. Seal strips in the housing along the region of the cavity therein nearest the axis of the cavity sealingly slide on the periphery of the piston.

---

The present invention relates to a rotary piston machine, especially circular piston internal combustion engine in which the piston profile is determined by a trochoid, especially epitrochoid so that accordingly the profile of the housing is shaped in conformity with the outer enveloping curve (characterization according to the book by Felix Wankel "Classification of Rotary Piston Machines Ka)," "Einteilung der Rotationskolbenmaschinen," published by Deutsche Verlagsanstalt, Abt. Fachverlag Stuttgart, 1963).

Rotary piston machines of the above mentioned type have been known for quite some time. This type of machine has in the last year not been paid too much attention because it appeared to be more favorable to develop rotary piston machines, especially circular piston internal combustion engines, in which the profile of the housing is determined by an epitrochoid so that accordingly the piston profile follows the inner enveloping curve of the epitrochoid provided with two axis-near zones or lobes (characterization according to Felix Wankel, "Classification of Rotary Piston Machines Si)." Such a circular piston internal combustion engine appeared for several reasons more advantageous than the rotory piston machine of the type involved in the present case. Heretofore it appeared possible only with the machine type "Si," and not with the machine type "Ka," to realize a four-cycle operation with a simple self-control. This situation cannot be remedied by heretofore known structural means as long as there is no fundamental solution for this problem. Furthermore, the type "Si" has the advantage that the transmission required for the kinematic control of the piston relative to the inner contour of the housing mantle is not subjected to the load by gaseous forces when the gas pressures at each point of the longitudinally extending and partially constricted combustion chamber are aqual. With the combustion method with which it can be expected that these conditions be met, for instance with gasoline engines with the customary low effective compression ratios, such transmissions can be mounted in a simple way in the piston. However, experience has shown that also with this type of motors non-negligible loads act upon the transmission which have to be taken into consideration when dimensioning the motor if extreme conditions of operations have to be expected and a long life is required. The same applies when the combustion chamber for combustion technical reasons has to assume a shape which is non-favorable for the load on the transmission but which is necessary in order to assure a maximum degree of efficiency for the combustion. In view of the then increased structural costs for the transmission and in view of the difficulty of a simple construction, it became imperative to abandon such combustion chamber structure also for the gasoline engine. As a result thereof, a compromise was made with regard to the shape of the combustion chamber and the arrangement of the spark plugs, with which a simple transmission is still sufficient while the exploitation of the fuel is poorer only by a still admissible amount, approximately 10%, than is the case for a comparable reciprocable piston engine. With motors with inner mixture formation, this compromise is intolerable in view of the necessary effective compression conditions which must not be below a certain value in order to maintain self-ignition. In such an instance, it is necessary to resort to transmissions which are able to withstand high loads. Depending on the type of combustion method, the loads inherent thereto result in rather expensive transmission constructions. The fundamental drawbacks and consequences inherent to the structure type "Si" in view of the limited possibility of designing the combustion chamber according to any desired shape and size and which are also due to the fact that with increasing piston movement in view of the split crescent shape of the combustion chamber charge transfers of the contents of the combustion chamber take place over adjacent zones, occur to an increased extent with engines with inner mixture formation. Without giving up the advantage to maintain the total working operation in one stage, it appeared on the basis of the heretofore carried out numerous and expensive development work with rotary piston diesel engines, that the above outlined situation and inter-related conditions could not be overcome. The decrease in the degree of efficiency of combustion became clearly evident at higher compression ratios in an unduly high fuel consumption so that it appears to be necessary to search for constructions of rotary piston engines which will assure a degree of efficiency with regard to the combustion which is comparable to that of reciprocatory piston engines even if such constructions might have other drawbacks. In view of these considerations based on the findings heretofore made with rotary piston engines, the above referred to type "Ka" appears to offer better chances to successfully realize the fundamental advantages of a rotary piston machine in connection with the movable mass over a reciprocatory piston machine. In view of the theoretically unlimited compression ratios, the type "Ka" offers the possibility of freely designing the combustion chamber in the same manner as is the case with reciprocatory internal combustion engines. That these expectations are well founded have been proved by papers delivered by experts in connection with rotary piston engines. In the book by Felix Wankel referred to at the end of the first paragraph of this specification, it has been brought out on page 18 in connection with rotary piston machines: "This machine type is appealing by the shape of its working chamber which is almost free from dead corners. The drawback of this machine form consists in that the power absorption and output is effected through gears. Also the possibilities of self-control are not particularly advantageous with this machine; in the form of a two stroke cycle engine, the piston runner is able by itself to control slots in the side walls of the housing while, however, similar to the reciprocatory piston two cycle engine, a pre-compression is necessary and only the short time periods taken away from the compression and expansion stroke are available for discharging scavenging and charging. When such machine is to operate as a four-stroke cycle engine, it is necessary according to the research carried out by Ernst Hoppner in 1957 to provide the piston runner with rotating lateral discs for the control operation. The piston rotor becomes rather heavy so that when employing the engine as a circular piston machine, the centrifugal force effected bearing load will increase considerably. In addition thereto, the increase in the structural dimension of the machine is not desired."

Another control possibility for the four stroke cycle engine, disregarding the reciprocable poppet valves is possible only by particularly driven rotary slides. The earlier combustion engines of this type have failed in view of these drawbacks and particularly in view of sealing difficulties.

It can be safely assumed that in spite of the power transmission through gears, an embodiment of this type of engine can be realized which will require less construction costs than corresponding circular piston engines. In this respect, the rotary piston machines of the type "Si" are approximately equal to the rotary piston machines of the type "Ka" as far as internal combustion engines are concerned if it is possible to realize the four stroke cycle operation by means of a self-control mechanism. The problem underlying the present invention has been realized according the present invention by the fact that for purposes of realizing the four stroke cycle method, the piston is employed the circumference of which is equipped with an even number of axis-near zones or lobes while every second circumferential arched surface of the piston between two successive axis-near zones is provided with an inlet control opening as well as with an outlet control opening.

In view of the structure according to the present invention, lateral discs which rotate for purposes of controlling the four stroke cycle process as well as reciprocable poppet valves and also particularly driven rotary slides will be avoided. The suggested type "Ka" furthermore has the advantage over the type "Si" that the course of the torque per revolution of the eccentric shaft is more uniform. Furthermore, for each disc, the variation in the course of the torque can by the selection of a corresponding lower transmission ratio (higher number of corners) be reduced without a loss in the compression ratio. In contrast thereto, with decreasing transmission ratio (with increasing number of corners), with the type "Si," the ε drops considerably (ε) standing for the compression ratio. With more than two corners, practically not even a gasoline engine operation can be realized.

Furthermore, the stationary arrangement of the sealing elements of the "Ka" type in the housing not only offers the possibility of an improved lubrication and intensive cooling but also affords a simple exchange possibility of the sealing elements from the outside without disassembly of the motor.

According to the present invention, the inlet and outlet control openings are through passages in the piston in communication with the inlet and outlet openings which are provided in the end faces of the piston. In this connection, it appears particularly advantageous to arrange the inlet openings on one end face of the piston and to arrange the outlet openings on the other end face of the piston. According to a further development of the present invention, the inlet and outlet openings respectively lead into a sealed collecting chamber of the housing of the machine. In this connection, care should be taken that the collecting chamber or chambers for the gas change are properly sealed with regard to the oil chambers of the machine. To this end, it is advantageous to select a contact-free seal as for instance a labyrinth type seal. Moreover, the gas collecting chambers may in a simple manner be connected to conduits on the outside, while the control of the machine is effected by inlet and outlet openings in the circumferential surface of the piston in cooperation with the sealing elements which are arranged inside the housing within the range of the axis-near zones.

The invention is illustrated by way of example in the accompanying drawings, in which:

FIG. 1 diagrammatically illustrates a cross section through a circular piston internal combustion engine in which the piston profile is formed by an epitrochoid with two axis-near zones or lobes.

FIG. 2 is a diagrammatic cross section similar to that of FIG. 1 for a circular piston internal combustion engine with four axis-near zones or lobes.

FIG. 3 illustrates on a scale somewhat larger than that of FIGS. 1 and 2 a longitudinal section through a circular piston internal combustion engine which, just considering the principle, could be viewed as a section through a machine according to FIG. 1 as well as through a machine according to FIG. 2.

Figure 4:
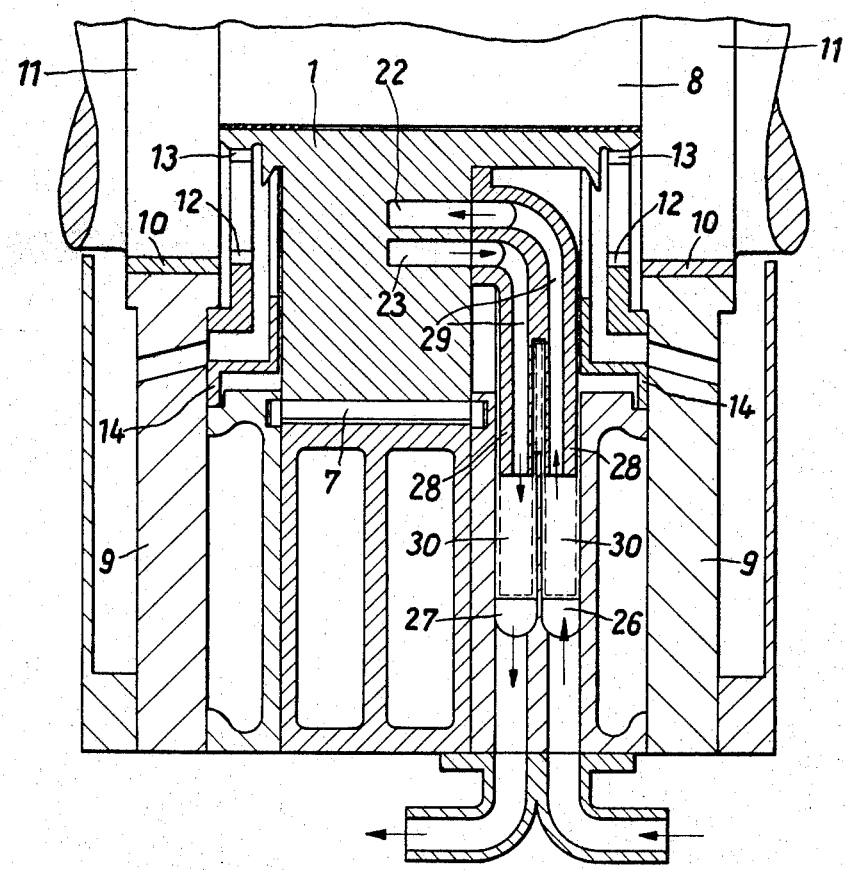
FIG. 4 is a fragmentary section like FIG. 3 but showing how the inlet and outlet passages could both be located on the same side of the rotary piston.

Referring now to the drawings in detail, the circular piston internal combustion engine according to FIG. 1 comprises a piston 1 the profile of which is determined by an epitrochoid 2 which has two axis-near zones or lobes 3 and 4. The inner profile 5 of the stationary housing 6 follows the outer enveloping curve of the epitrochoid 2. The sealing strips 7 which act radially and are necessary for sealing the working chambers are arranged in the corners of the axis-near zones of housing 6. Piston 1 is mounted on an eccentric 8 the shaft of which is designated with the reference numeral 11 and is journalled in bearings 10 (FIG. 3) of the side walls 9 of the housing. For kinematically controlling piston 1 relative to the housing 6 there is provided a transmission which comprises a gear 12 stationarily arranged in the housing and provided with inner teeth, and furthermore comprises a gear 13 which is connected to the piston 1. The transmission is a double transmission which means that gears 12 and 13 are arranged on each side with the gears provided in housing portions separated from the piston chamber, said housing portions being de-limited by a ring 14.

The inner mantle surface determined by the outer enveloping curve 5 of the epitrochoid, together with the outer circumferential surface of the piston forms three working chambers 15, 16, 17 respectively communicating with separate combustion chambers 18 into which a fuel injection nozzle 19 leads.

The above described circular piston internal combustion engine operates according to the four stroke cycle principle. The control of the change is effected by inlet control openings 20 and outlet control openings 21 which in this instance are located on one and the same circumferential arch of the piston between the axis-near zones or lobes 3 and 4. The said control openings are adapted to move over the radially acting sealing strips 7 in conformity with the movement of the piston.

The inlet control openings 20 and the outlet control openings 21 are in communication with an inlet opening 22 and outlet opening 23 respectively through the intervention of passages 24, 25 or the like provided in piston 1. The inlet passage arranged between the inlet control opening 20 and the said inlet opening 22 is designated with the reference numeral 24. Correspondingly, the outlet passage is designated with the reference numeral 25.

As will be evident from FIG. 3, the inlet opening 22 is arranged on an end face of piston 1 while the outlet opening 23 is located on the other end face of piston 1. For purposes of simplifying the illustration, FIG. 3 shows the openings 22 and 23 in a somewhat displaced way so that they could be seen in the illustrated section.

Openings 22 and 23 lead into lateral collecting chambers 26 and 27 which are sealed with regard to the oil chambers of the engine. The seal is effected by contact-free labyrinths. In the illustrated embodiment of the invention, the said labyrinths are formed by the fact that lateral discs 28 which are connected to piston 1 and have radially outwardly directed disc-shaped passages 29 leading into the collecting chambers 26, 27 immerge with slight lateral play in the disc-shaped annular chambers 30 located ahead of the collecting chambers 26 and 27.

The operation of the machine according to FIG. 1 is as follows:

The position of piston 1 as shown in FIG. 1 corresponds to the upper dead center point for the working chamber 15. The piston previously compressed the combustion air so that the combustion can take place in the working chamber 15. To this end, nozzle 19 injects fuel into the combustion chamber 18 communicating with the working chamber 15. Through inlet passage 24 which is in open communication with the working chamber 16, combustion air is drawn in, whereas exhaust gases are discharged from the working chamber 17 through the discharge passage 25. According to the direction of rotation of the piston as indicated in FIG. 1 by the arrow A, the working chamber 16 is increasing, whereas the working chamber 17 is decreasing. When the discharge opening 21 has passed over the radial seal 7 closest to the opening 21, when considering the direction of rotation, the discharge step will be completed. Approximately simultaneously therewith, the inlet step for the working chamber 16 is completed because the inlet control opening 20 moves over the respective closest radial seal 7 when considering the direction of rotation of the piston. By the spacing of the control openings 21 and 22, the control times can be changed at random. As soon as the working chamber 15 establishes communication with the discharge passage 21, the discharge stroke for the working chamber 15 starts, whereas for the working chamber 16 the compression stroke is initiated. For the working chamber 17 the intake stroke will at this time be initiated. In the above mentioned way, for all working chambers, there will successively take place the intake, the compression, the combustion with expansion, the discharge in a manner well known in connection with the four stroke cycle principle.

The engine according to FIG. 2 differs from that of FIG. 1 primarily in that the piston has twice the number of axis-near zones or lobes as FIG. 1, and the operation will be effected accordingly.

The section of the engine in FIGURE 4 is the same as the engine shown in FIGURE 3, and the same reference numerals have been employed. FIGURE 4 merely shows the possibility of arranging both of the inlet and outlet passages on one and the same side of the engine.

It is, of course, to be understood that the present invention is, by no means, limited to the particular constructions shown in the drawings but also comprises any modifications within the scope of the appended claims. Thus, the invention is not limited to single or double pistons but can be employed in connection with all rotary piston engines of the type involved in which the pistons have an even number of axis-near zones.

What I claim is:

1. A rotary piston engine comprising; a housing having a cavity therein and a rotary piston in said cavity, shaft means rotatable in the housing and having an eccentric portion on which said piston is journaled, an internal gear on the housing and an external gear on the piston, said gears meshing whereby the piston rotates on said eccentric portion while being moved in an orbital path thereby, said piston in cross section having the shape of an epitrochoid with a certain even number of lobes and said cavity in cross section taking the shape of the curve which envelops the rotating piston and which curve has an odd number of lobes one more in number than the number of lobes on said piston, said housing comprising end plate means closing the ends of said cavity and confining the ends of said piston, sealing strips in said housing extending axially in those portions of the cavity that are nearest the axis of said shaft and sealingly engaging the piston to seal each lobe region of the cavity from the others thereof, the lobes of the piston substantially filling the lobes of the cavity in said housing as the piston rotates in the cavity, separate inlet and outlet passages in said rotor leading to opposite sides of alternate ones of the lobes thereon, inlet and outlet collecting chambers in said housing, means connecting said inlet and outlet passages with said inlet and outlet chambers respectively and seal means sealing said chambers from each other and from the remainder of the inside of said engine.

2. A rotary piston engine according to claim 1 in which said means connecting said passages with said chamber are in the form of disc means fixed to the piston to move therewith and having passages therein which communicate at one end with said inlet and outlet passages in the piston and at the other end open into said chambers, said chambers being in the form of annular chambers in said end plate means having radial confining walls, said disc means having radial walls disposed closely adjacent said radial confining walls whereby said walls form the said seal means for said chambers.

3. A rotary piston engine according to claim 2 in which said end plate means comprises an end plate at each end of said cavity, a respective disc on each end of the piston, and one of said chambers being located in one of said end plates and the other thereof being located in the other of said end plates.

4. A rotary piston engine according to claim 2 in which said end plate means comprises an end plate at each end of said cavity, both of said chambers being located in a single one of said end plates in side by side relation with an annular rib therebetween, said disc means comprising a single disc on said piston on the end thereof adjacent said one end plate, the inlet and outlet passages being axially spaced in said disc, and a radial groove in the periphery of the disc between the inlet and outlet passages in the disc and receiving said annular rib.

5. A rotary piston engine according to claim 2 which includes fuel injection means in said housing for each lobe in said cavity.

References Cited

UNITED STATES PATENTS

| | | |
|---|---|---|
| 211,582 | 1/1879 | Nash. |
| 2,947,290 | 8/1960 | Froede. |
| 3,224,421 | 12/1965 | Peras. |
| 3,301,228 | 1/1967 | Winans. |
| 3,340,853 | 9/1967 | Link. |

FOREIGN PATENTS 951,600  10/1956  Germany.

FRED C. MATTERN, JR., *Primary Examiner.*

W. J. GOODLIN, *Assistant Examiner.*